United States Patent [19]

Saito et al.

[11] Patent Number: 4,847,557
[45] Date of Patent: Jul. 11, 1989

[54] HERMETICALLY SEALED MAGNETIC SENSOR

[75] Inventors: Hidetoshi Saito; Masahiro Kume, both of Hyogo; Kazuo Mizuno, Osaka, all of Japan

[73] Assignee: Sumitomo Electric Industries, Ltd., Osaka, Japan

[21] Appl. No.: 166,228

[22] Filed: Mar. 10, 1988

[30] Foreign Application Priority Data

Mar. 18, 1987 [JP] Japan .................................. 62-65165
Mar. 19, 1987 [JP] Japan .................................. 62-66685
Mar. 24, 1987 [JP] Japan .................................. 62-69771
Apr. 30, 1987 [JP] Japan ................................. 62-107530
Jun. 15, 1987 [JP] Japan ............................. 62-91800[U]

[51] Int. Cl.$^4$ .......................... G01B 7/14; G01P 3/48; G01P 3/54; H02G 13/08
[52] U.S. Cl. ................................... 324/208; 324/173; 336/96; 174/52.2; 264/272.16; 29/607

[58] Field of Search ................ 324/207, 208, 173, 174, 324/228, 239; 336/96; 174/52 PE; 264/272.11, 272.16, 272.19, 272.20; 29/602 R, 607

[56] References Cited

U.S. PATENT DOCUMENTS 3,793,545 2/1974 Leiber et al. ......................... 324/174
4,463,312 7/1984 Oda et al. ............................ 324/174

Primary Examiner—Reinhard J. Eisenzopf
Assistant Examiner—Walter E. Snow
Attorney, Agent, or Firm—W. G. Fasse; D. H. Kane, Jr.

[57] ABSTRACT

A hermetically sealed magnetic sensor for detecting variations in a magnetic field has a sensor element with an output terminal for detecting variations in the magnetic field and generating a signal. An output wire is connected with one end to the terminal for outputting a respective signal from the sensor element. A case having an opening on a side close to the output wire contains the sensor element. A first thermosetting resin fills the case for covering the sensor element. A second thermoplastic resin hermetically seals the opening in the case.

15 Claims, 7 Drawing Sheets

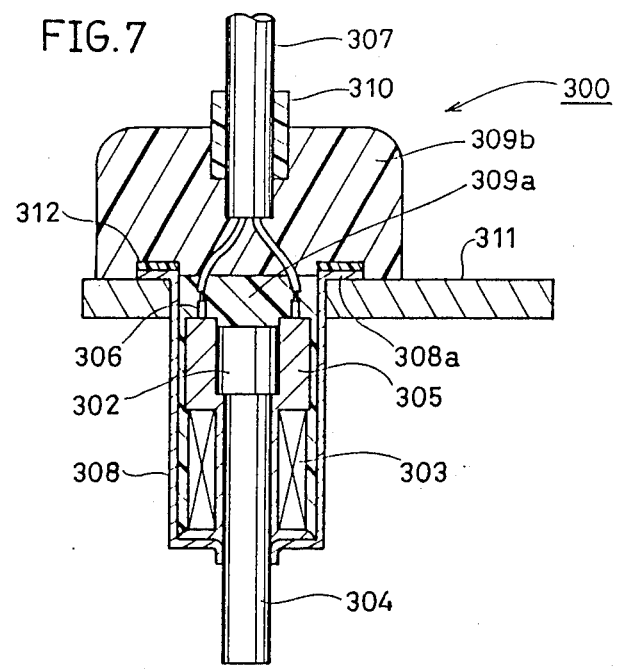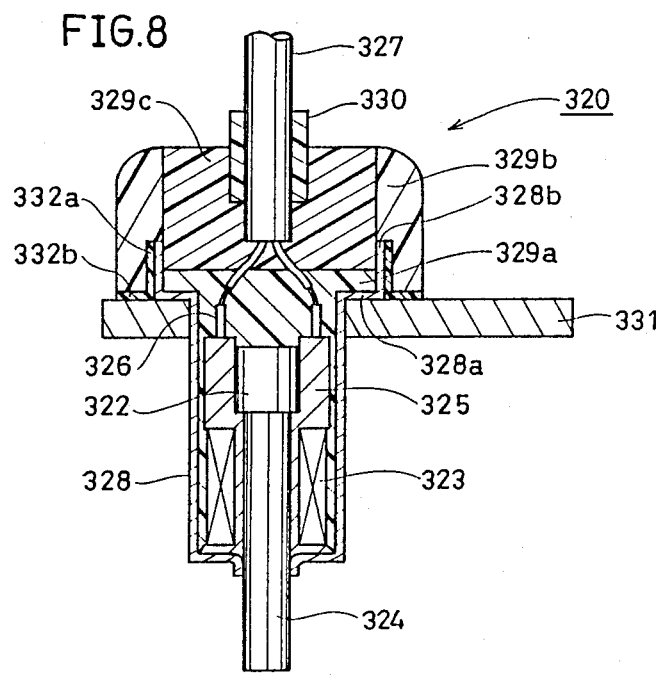

HERMETICALLY SEALED MAGNETIC SENSOR

BACKGROUND OF THE INVENTION

1. Field of the Invention

The present invention relates to a hermetically sealed magnetic sensor for detecting variations in a magnetic field, more particularly, the present sensor is intended for use in an automobile etc., which requires an effective sealing against the external environment.

2. Description of the Prior Art

In general, various sensors such as a rotation sensor, a temperature sensor, a pressure sensor, an acceleration sensor and the like, are known for use in an automobile or the like. In particular, rust resistance against brine or the like, vibration resistance, shock resistance, water tightness and the like are required for a rotation sensor for detecting the wheel speed etc. mounted in a tire housing, for example, which is directly exposed to the external environment.

FIG. 1 is a sectional view showing an example of a conventional rotation sensor 1 having a sensor means including a magnet 2, a coil 3, a magnetic pole 4 and a bobbin 5 contained in a case 8. Terminals 6 are provided on both ends of a winding wound on the coil 3, to be connected to an end of an output wire 7. A resin member 9 is formed within the case 8 by resin molding. An output wire protective member 10 is provided around a part of the output wire 7 located in an opening of the case 8. Thus, the output wire 7 is convered by the resin member 9 through the output wire protective member 10 in the opening. A bracket 11 is mounted on the outer side of the case 8, to fix the rotation sensor 1 in a prescribed position.

The resin member 9 is generally made of thermosetting resin, such as epoxy resin.

In the conventional rotation sensor as hereinabove described, the resin is molded in the case to fix the sensor element in the case and the output wire connected thereto, as well as to maintain a water/air tight of hermetic seal of the case. However, such a conventional rotation sensor does not necessarily have a sufficient water/air tightness. A more reliable structure having a better water/air tightness is required particularly for a sensor for an automobile etc., which is used for a long time under severe operating conditions. Such a sensor for an automobile further requires an improved mechanical strength such shock resistance, since the same is subjected to extreme vibrations during operation of the vehicle.

SUMMARY OF THE INVENTION

The present invention intends to satisfy the aforementioned general requirements, and has for its object to provide a sensor which has an improved water/air tightness, a high vibration resistance, and a high shock resistance.

A sensor for detecting variations in a magnetic field according to the present invention, comprises a sensor element having a terminal, for detecting variations in the magnetic field and for generating a respective signal, an output wire having an end connected to the terminal for outputting the signal from the sensor element, a case having an opening in proximity to the output wire, for containing the sensor element. A first thermosetting resin member fills the case for covering the sensor element. A second thermoplastic resin member hermetically seals the opening in the case.

According to the present invention, the sensor element is covered by the first resin member and the opening portion of the case is sealed by the second resin member, whereby the sensor is substantially improved in its water/air tightness as compared with a conventional sensor of this type.

Further, the mechanical strength has been improved since the second resin member may be made of a resin which is particularly excellent in shock resistance.

In addition, the second resin member may be molded without damaging the sensor element, which is covered by the first resin member. Thus, the assembling steps have been simplified whereby a stable, uniform product results.

In a preferred embodiment of the present invention, a connecting portion between the terminal of the sensor element and the output wire, is covered by the first resin member. Preferably, the first thermosetting resin is epoxy resin and the second thermoplastic resin is polyamide resin such as a nylon resin.

According to such an embodiment, the connecting portion between the sensor element and the output wire is not degraded of damaged even if the second resin member is molded into the case opening portion under high termperature/high pressure conditions, since the connecting portion is covered and protected by the first thermosetting resin member. Thus, the second thermoplastic resin member can be molded under higher temperature/higher pressure conditions, to form a a tighter seal between the second resin member and the case, and between the second resin member and the output wire.

Further, the second resin member can be made of a resin material which is different from that for the first resin material.

Thus, the second resin member can be made of a resin having a high mechanical strength such as a fiberglass reinforced nylon resin.

In another preferred embodiment of the present invention, the connecting portion between the terminal of the sensor element and the output wire is covered by the second resin member.

In such an embodiment, the first resin member covers only a lower portion of the terminal of the sensor element, whereby an upper portion of the terminal is exposed after the first resin has been filled into the case. Therefore, the output wire can be easily connected to the upper portion of the terminal. Thus, it is not necessary to connect the output wire to the terminal immediately after formation of the first resin member, whereby the case can be easily handled thereby facilitating the manufacturing steps and greatly improving the productivity.

In still another embodiment of the present invention, a junction resin is provided between the case, filled with the first resin member, and the second resin member. Preferably the case is made of a metal while the junction resin member is made of a thermoplastic resin, and more preferably, of urethane resin or of polyamide resin. Further, the second resin member is preferably made of a polyamide resin.

In such an embodiment, the sealing performance of the case is further improved since the junction resin member is provided between the case and the second resin member.

In a further embodiment of the present invention, a third resin part is provided for covering a connecting portion between the output wire and the terminal of the sensor element after the first resin member is filled into the case containing the sensor element.

Preferably the third resin member is made of thixotropic resin which has a thermal expansion coefficient substantially identical to that of the first resin member. Preferably the first and third resin members are made of thermosetting resins and the second resin member is made of thermoplastic resin.

A sensor according to the invention may be manufactured by, for example, installing a magnet, a coil, a magnetic pole and a bobbin etc. in a case to form a sensor element, connecting the sensor element with an output wire by a terminal, filling-up the case with a first resin to form a first resin member, covering the terminal by a third resin to form an intermediate resin member, and covering an opening of the case, the third resin member and the output wire by a second resin forming a second resin member.

According to such an embodiment, a connecting portion between the output wire and the terminal is prevented from disconnection even is the second resin member is molded under high temperature/high pressure conditions, since the connecting portion is covered and protected by the third intermediate resin member. The third resin member is made of a thixotropic resin so that no dripping of resin is caused during the covering, thereby to improve the productivity. Further, the third resin member is preferably made of a resin having a relatively small thermal expansion coefficient which is identical or substantially identical to that of the first resin member for preventing a disconnection between the output wire and the terminal that may otherwise be caused by thermal expansion.

In a further embodiment of the present invention, the case has a flange in the vicinity of its opening, while a bracket is mounted on the outer periphery of the case for fixing the sensor an elastic ring is provided on an outer peripheral portion of the case between the bracket and the flange. The ring is held under pressure between the flange and the bracket, so that the portion between the flange and the bracket is covered by the second resin member when molding of the second member is completed. The ring is preferably made of rubber or resin. Preferably, a resin ring is melted onto the second resin member for adhering thereto.

The elastic ring is fixed by the second resin member adhering to the flange and the bracket by its impact resilience. Therefore, even if a clearance is present between the bracket and the case or between the bracket and the second resin member water cannot infiltrate into the case since the clearance between the case and the bracket or between the case and a resin-molded portion is sealed by the elastic ring.

These and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a sectional view showing a rotation sensor according to a sixth embodiment of the present invention;

FIG. 8 is a sectional view showing a rotation sensor according to a seventh embodiment of the present invention;

DETAILED DESCRIPTION OF PREFERRED EXAMPLE EMBODIMENTS AND OF THE BEST MODE OF THE INVENTION

Figure 1:
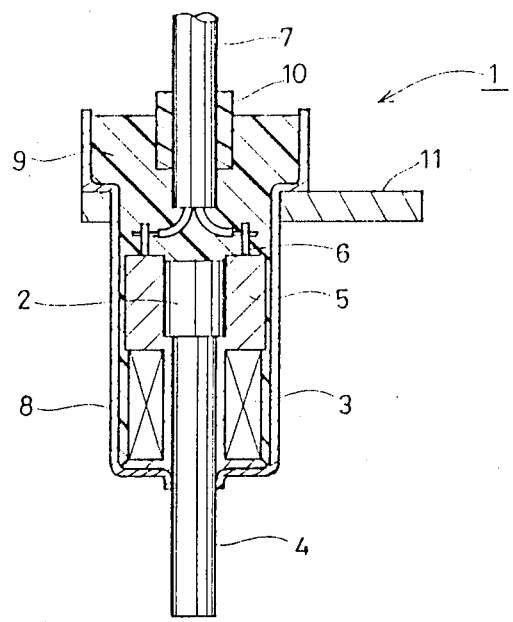
FIG. 1 is a sectional view showing a conventional rotation sensor.
Figure 2:
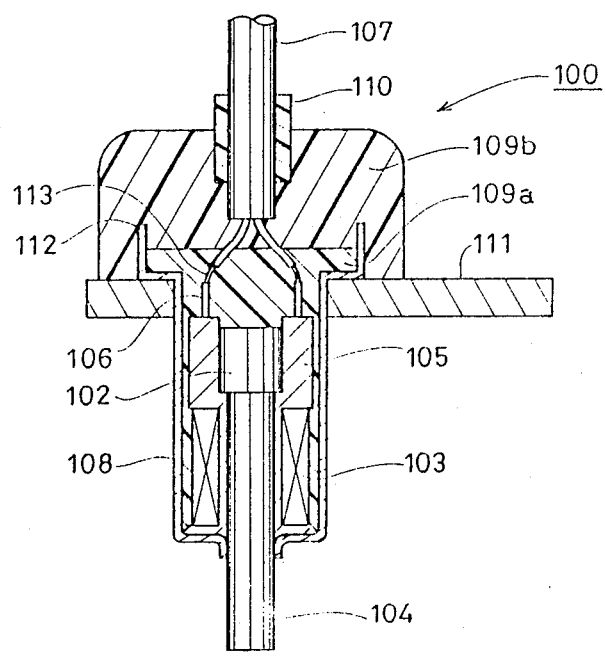
FIG. 2 is a sectional view showing a rotation sensor according to a first embodiment of the present invention.

FIG. 2 is a sectional view showing a rotation sensor 100 according to a first embodiment of the present invention, including a magnet 102 and a magnetic pole 104 mounted on the same, said magnet and pole being provided in a bobbin 105. A coil 103 is provided around the bobbin 105. Terminals 106 are mounted on both end portions of a winding of the coil 103. The magnet 102, the coil 103, the magnetic pole 104 and the bobbin 105 form a sensor element, which is contained in a case 108. Forward end portions 113 of an output wire 107 are connected to the terminals 106 of the sensor element. A first resin member 109a is filled into the case 108, to cover connecting portions between the terminals 106 of the sensor element and the output wire 107. The first resin member 109a is made of epoxy resin having a low thermal expansion coefficient.

A bracket 111 surrounds the case 108, for fixing the rotation sensor 100 in a prescribed position. A second resin member 109b is molded in an opening 112 of the case 108. An output wire protective member 110 surrounds a portion of the output conductor 107 close to its end. The second resin member 109b is adapted to entirely cover the opening 112 of the case 108 for hermetically sealing a clearance between the case 108 and the first resin member 109a. The second resin member 109b is made of fiberglass reinforced nylon resin. The output wire protective member 110 is made of urethane resin, and the case 108 is made of stainless steel of the type SUS304.

In this embodiment, the second resin member 109b is so molded in the vicinity of the opening 112 for sealing the clearance between the first resin member 109a and the case 108, thereby to improve the water/air tightness of the rotation sensor 100. Further, the sensor element is not damaged by the formation of the second resin member 109b, since the sensor element is already covered and protected by the first resin member 109a.

Figure 3:
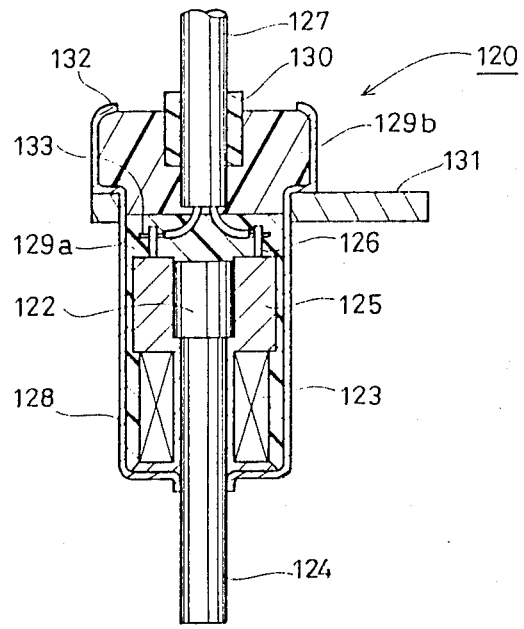
FIG. 3 is a sectional view showing a rotation sensor according to a second embodiment of the present invention.

FIG. 3 is a sectional view showing a rotation sensor 120 according to a second embodiment of the present invention. In the rotation sensor 120 as shown in FIG. 3, a magnet 122, a coil 123, a magnetic pole 124 and a bobbin 125 form a sensor element contained in a case 128. The case 128 is filled-up with a first resin member 129a by molding. The first resin member 129a covers connecting portions between forward end portions 133 of an output wire 127 and terminals 126 of the sensor element. In this embodiment, a second resin member 129b is provided in the case 128 by molding. An end of an opening 132 of the case 128 is inwardly caulked or sealed by the second resin member 129b. In such structure, a clearance between the case 128 and the first resin member 129a can also be sealed by the second resin member 129b. Further, a clearance between the second resin member 129b and the output wire 127 can be sealed through an output wire protective member 130. A mounting bracket 131 surrounds the outer periphery of the case 128.

Figure 4:
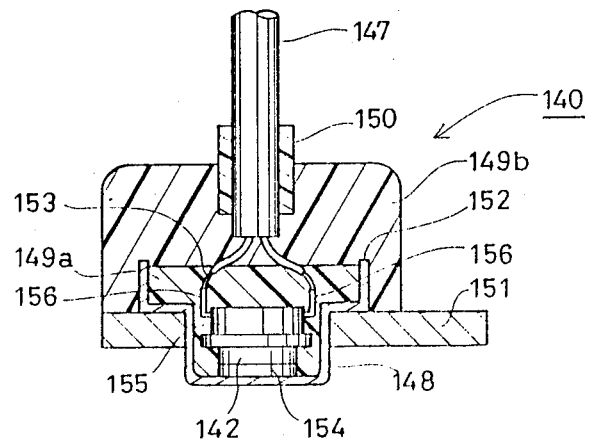
FIG. 4 is a sectional view showing a magnetic sensor according to a third embodiment of the present invention.

FIG. 4 is a sectional view showing a magnetic sensor 140 according to a third embodiment of the present invention. In the magnetic sensor 140 as shown in FIG. 4, a magnet 142 is provided in a case 148, and a magnetic resistance element 154 is mounted on one side of the magnet 142. The magnetic resistance element 154 is in contact with the inner surface of the case 148. An electric circuit element 155 is provided on another side of the magnet 142, and terminals 156 are mounted on the electric circuit part 155. Forward end portions 153 of an output wire 147 are connected to the terminals 156. The magnet 142, the magnetic resistance element 154, the electric circuit part 155 and the terminals 156 thereof form a sensor element, which is contained in the case 148 to be covered by a first resin part 149a. A bracket 151 is mounted around the outer side of the case 148.

A second resin member 149b is molded to cover an opening 152 of the case 148. A clearance between the case 148 and the first resin member 149a is sealed by the second resin member 149b. Further, a clearance between the output wire 147 and the second resin member 149b is also sealed by an output wire protective member 150.

Preferably the first resin member 149a is made thermosetting resin in view of its electric characteristics etc. and the second resin member 149b is made of thermoplastic resin in view of its molding workability etc.

Figure 5:
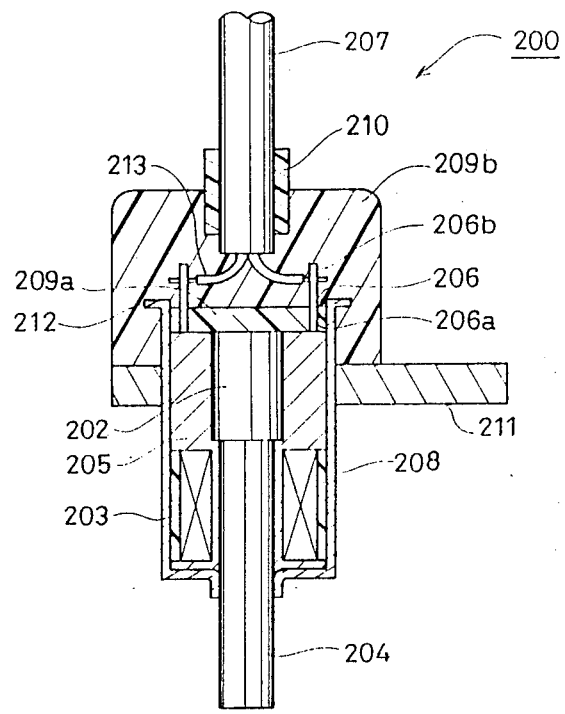
FIG. 5 is a sectional view showing a rotation sensor according to a fourth embodiment of the present invention.

FIG. 5 is a sectional view showing a rotation sensor 200 according to a fourth embodiment of the present invention. In the rotation sensor 200 as shown in FIG. 5, a magnet 202, a coil 203, a magnetic pole 204 and a bobbin 205 form a sensor element, which is contained in a case 208. The case 208 is filled with a first resin member 209a by molding. The first resin member reaches close to an opening 212. Both ends of a wire wound on the coil 203 are soldered to lower portions 206a of terminals 206, which lower portions 206a are covered by the first resin member 209a.

A bracket 211 for mounting the rotation sensor 200, is joined to the outer side of the case 208 by brazing. Forward end portions 213 of an output wire 207 are caulked and joined to upper portions 206b of the terminals 206. A pipe-shaped output wire protective member 210 surrounds a portion of the output wire 207 close to the forward end portions 213.

An opening 212 of the case 208 is covered by a second resin member 209b, which also covers the upper portions 206b of the terminals 206. The second resin member 209b is molded under high temperature and high pressure conditions, whereby the case opening 212, the output wire protective member 210, and a side of the bracket 211 close to the output wire 207 are bonded, to the second resin member 209b, respectively.

In this embodiment, the first resin member 209a is made of epoxy resin and the second resin member 209b is made of fiberglass reinforced nylon resin. Further, the output wire protective member 210 is made of urethane resin and the case 208 is made of stainless steel of the type SUS304.

Figure 6:
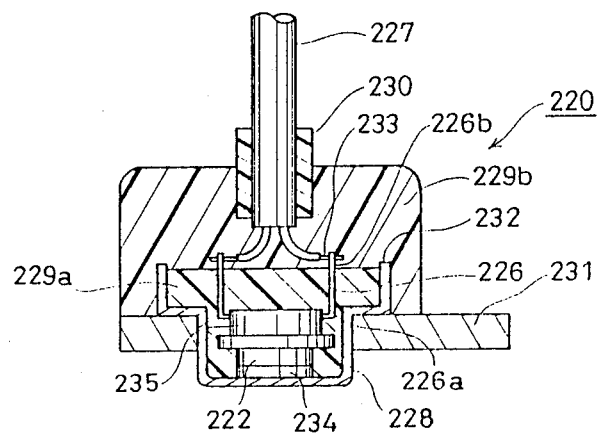
FIG. 6 is a sectional view showing a magnetic sensor according to a fifth embodiment of the present invention.

FIG. 6 is a sectional view showing a magnetic sensor 220 according to a fifth embodiment of the present invention. The magnetic sensor 220 as shown in FIG. 6 has a magnetic resistance element 234 in contact with the bottom surface of a case 228 and a magnet 222 provided on the magnetic resistance element 234. An electric circuit element 235 is located above the magnet 222. The electric circuit element 235 has a pair of terminals 226 having lower portions 226a connected thereto. The magnet 222, the magnetic resistance element 234 and the electric circuit element 235 form a sensor element contained in a case 228, which is filled with a first resin member 229a by molding. The lower portions 226a of the terminals 226, serving as connections to the sensor element, are also covered by the first resin member 229a.

Forward end portions 233 of an output cable 227 are connected to upper portions 226b of the terminals 226. An opening 232 of the case 228 is covered by a second resin member 229b, which also covers the upper portions 226b of the terminals 226. The second resin member 229b is molded under high temperature and high pressure conditions, whereby the case opening 232, the output wire protective member 230, and a surface of the bracket 231 close to the output wire 227 are bonded to the second resin member 229b.

The first resin member 229a, the second resin member 229b, the case 228, and the output wire protective member 230 are made of materials identical to those in the embodiment shown in FIG. 5.

In each of the embodiments of FIGS. 5 and 6, the output wire can be connected to the upper portions of the terminals after the case is filled with the first resin forming the first resin member which covers only the lower portions of the terminals. Thus, the output wire is not yet connected to the sensor element immediately after formation of the first resin member, which can be easily handled in operation to substantially improve the productivity.

FIG. 7 is a sectional view showing a rotation sensor 300 according to a sixth embodiment of the present invention. In the rotation sensor 300 as shown in FIG. 7, a magnet 302, a coil 303, a magnetic pole 304, and a bobbin 305 form a sensor element contained in a case 308. Resin is filled into the case 308, to form a first resin member 309a. The sensor element is fixed in the case 308 by the first resin member 309a. An end portion of the magnetic pole 304, serving as a detecting part, projects outwardly from the case 308. A flange 308a is formed in an end portion of the case 308 close to its opening. A bracket 311 for mounting the rotation sensor 300 in a prescribed position, is secured on an outer peripheral part of the case 308 in contact with the flange 308a.

Terminals 306 are provided at both ends of a winding wound forming the coil 303, to be connected with end portions of lead wires extending from an output cable 307. A pipe-shaped output wire protective member 310 end of the output cable 307.

A second resin member 309b covers an opening portion of the case 308, and a junction resin member 312 is formed between the second resin member 309b and the flange 308a.

In this embodiment, the first resin member 309a is made of epoxy resin and the second resin member 309b is made of fiberglass reinforced nylon resin. The junction resin member 312 is made of urethane resin, and the case 308 is made of stainless steel of the type SUS304. The junction resin member 312 is provided on the flange 308a of the case 308 prior to molding of the second resin member 309b. The junction resin member 312 is softened of part melted by heat and pressure for molding the second resin member 309b, for bonding to the flange 308a and to the second resin member 309b. The surface of the junction resin member 312 may be irregularized or rather roughened before molding of the second resin member 309b, to further improve the adhesion therebetween.

FIG. 8 is a sectional view showing a rotation sensor 320 according to a seventh embodiment of the present invention. In the rotation sensor 320 as shown in FIG. 8, a sensor element comprises a magnet 322, a coil 323, a magnetic pole 324, and a bobbin 325 contained in a case 328. Resin is filled into the case 328, to form a first resin member 329a. The sensor element is fixed in the case 328 by the first resin member 329a. An end of the magnetic pole 324 is adapted to outwardly project from the case 328. The case 328 has a flange 328a surrounding its open end portion and a cylindrical portion 328b extending toward an output cable 327 from the flange 328a. In this embodiment, junction resin members 332a and 332b surround the outer periphery of the cylindrical portion 328b and on the surface of a bracket 331 respectively. Connecting portions between lead wires of the output cable 327 and terminals 326 are embedded in the first resin member 329a, while the output cable 327 and an output cable protective member 330 are partially embedded in a second resin member 329c. Another second resin member 329b is formed around the second resin member 329c. In this embodiment the second resin member is divided into two second resin elements 329b and 329c.

The junction resin member 332a around the outer periphery of the cylindrical portion 328b is made of polyamide resin, while the junction resin member 332b on the surface of the bracket 331 is made of urethane resin.

Figure 9:
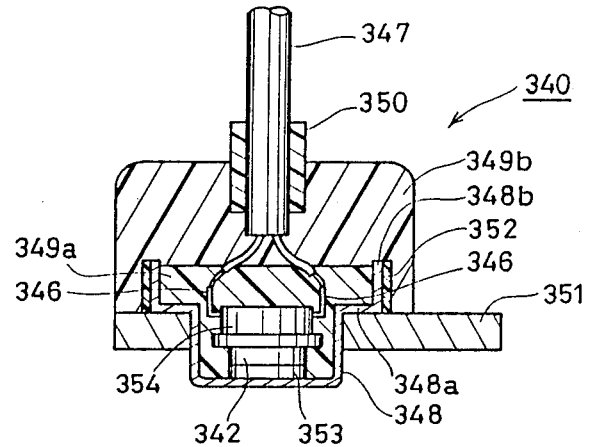
FIG. 9 is a sectional view showing a magnetic sensor according to an eighth embodiment of the present invention.

FIG. 9 is a sectional view showing a magnetic sensor 340 according to an eighth embodiment of the present invention. The magnetic sensor 340 as shown in FIG. 9 comprises a magnet 342 in a case 348 and a magnetic resistance element 353 mounted on one side of the magnet 342. The magnetic resistance element 353 contacts the inner surface of the case 348. An electric circuit element 354 is provided on another side of the magnet 342, and terminals 346 are mounted on the electric circuit element 354. The magnet 342, the magnetic resistance element 353, the electric circuit element 354 and the terminals 346 thereof form a sensor element, contained in the case 348 covered by a first resin member 349a. The case 348 is provided in its opening end portion with a flange 348a and a cylindrical portion 348b. A second resin member 349b covers an opening of the case 348. A junction resin member 352 made of urethane resin surrounds the outer periphery of the cylindrical portion 348b. An output cable 347 is covered by the second resin member 349b through an output cable protective member 350. A bracket 351 is mounted around the outer periphery of the case 348.

In each of the embodiments shown in FIGS. 7, 8 and 9, the junction resin member is formed between the case and the second resin member, whereby the case is more completely sealed against infiltration of water through a clearance between the case and the second resin member.

The junction resin member is preferably made of a material which is molten by heat, such as a thermoplastic resin. For molding of the second resin member, such a junction resin member may be melted or softened so that the case and the second resin member are bonded to each other, thereby to more completely seal the case.

Figure 10:
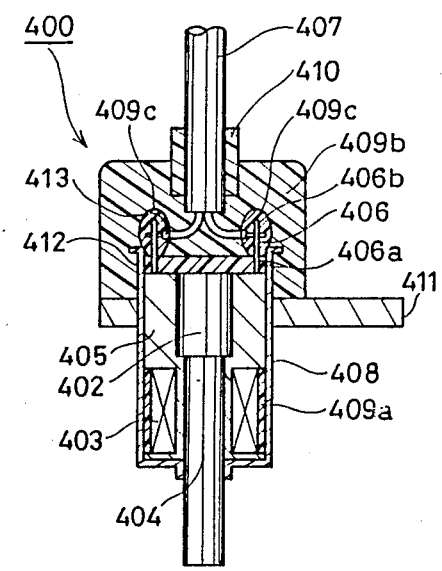
FIG. 10 is a sectional view showing a rotation sensor according to a ninth embodiment of the present invention.

FIG. 10 is a sectional view showing a rotation sensor 400 according to a ninth embodiment of the present invention. In the rotation sensor 400 shown in FIG. 10, a sensor element comprises a magnet 402, a coil 403, a magnetic pole 404, and a bobbin 405 contained in a case 408. The case 408 is filled by molding with a first resin forming a second resin member 409a extending close to an opening 412.

Lower portions 406a of terminals are covered and protected by a first resin member 409a. Winding ends of the coil 403 are soldered to lower parts of upper portions 406b of the terminals 406. Forward end portions 413 of an output wire of the cable 407 are caulked and joined to upper parts of the terminals 406. Parts of the upper portions 406b of the terminals 406 extending upwardly from the first resin member 409a are covered by third resin members 409c. The case 408 is secured to a mounting bracket 411 by brazing. The opening 412 of the case 408 is further integrally sealed by a molded second resin member 409b. Through such molding, the case opening 412, an output wire protective member 410, and the bracket 411 are partially closely bonded to the second resin member 409b respectively. Such close bonding is attained by increasing pressure under a high temperature for molding of the second resin member 409b. In this embodiment, the first resin member 409a is made of epoxy resin having a low thermal expansion coefficient, and the third resin members 409c are made of thixotropic epoxy resin having a thermal expansion coefficient substantially identical to the thermal expansion coefficient of the first resin member 409a. The second resin member 409b is made of fiberglass reinforced nylon resin. The output cable protective member 410 is made of urethane resin and the metal case 408 is made of stainless steel of the type SUS304, respectively.

Figure 11:
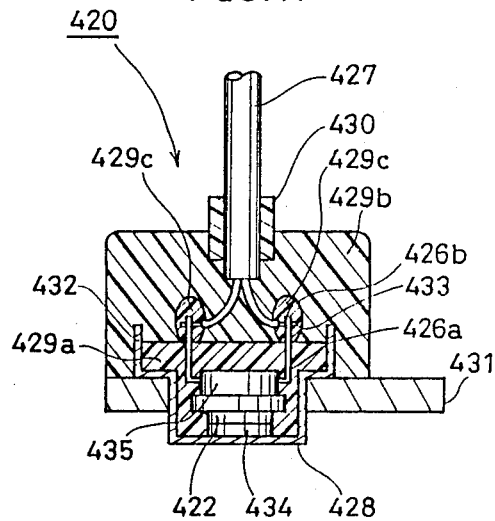
FIG. 11 is a sectional view showing a magnetic sensor according to a tenth embodiment of the present invention.

FIG. 11 is a sectional view showing a magnetic sensor 420 according to a tenth embodiment of the present invention. In the magnetic sensor as shown in FIG. 11, a sensor element formed by a magnetic resistance element 434, a magnet 422 and an electric circuit element 435, is contained in a case 428 a first resin member 429a is molded and integrated with lower portions of the terminals connected with to a sensor connecting portion. Forward end portions 433 of an output cable 427 are soldered to upper portions 426b of the terminals. The upper portions 426b of the terminals are covered by third resin members 429c made of thixotropic resin. An opening portion 432 of the case 428 is sealed by a second resin member 429b. An output cable protective member 430 is mounted on a part of an output cable 427, in contact with a second resin member 429b. A part of a bracket 431 secured around the outer periphery of the case 428 is also closely in contact with the second resin member 429b.

In each of the embodiments as shown in FIGS. 10 and 11, the upper portions of the terminals are covered and protected by the third resin members, whereby the connecting portions between the output wire and the terminals can be prevented from being disconnected even if the second resin member is molded under high temperature and high pressure conditions.

Figure 12:
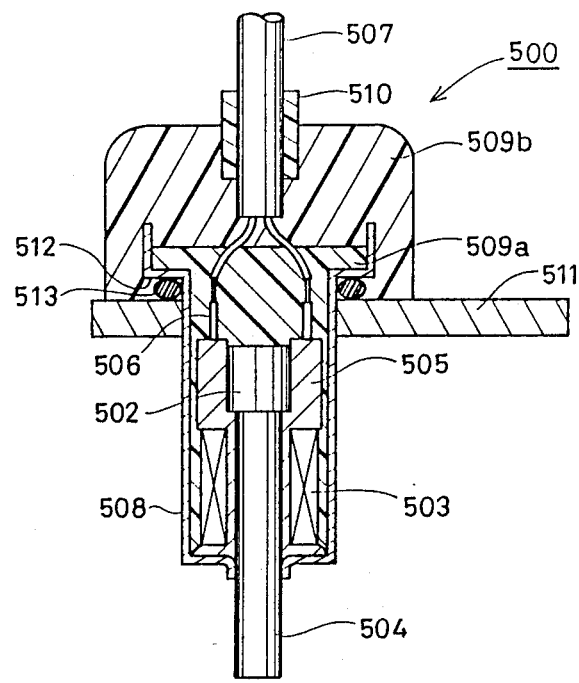
FIG. 12 is a sectional view showing a rotation sensor according to an eleventh embodiment of the present invention.

FIG. 12 is a sectional view showing a rotation sensor 500 according to an eleventh embodiment of the present invention. The rotation sensor 500 as shown in FIG. 12 has a magnet 502 and a magnetic pole 504 mounted on the magnet provided in a bobbin 505. A coil 503 is wound around the bobbin 505, and terminals 506 are connected to both end portions of a winding of the coil 503.

The magnet 502, the coil 503, the magnetifc pole 504 and the bobbin 505 form a sensor element, which is contained in a case 508. Forward end portions of conductor wires in an output cable 507 are connected to the terminals 506 of the sensor element. Resin is filled into the case 508 by molding to form a first resin member 509a. The first resin member 509a covers the sensor element and portions close to the terminals 506, serving as connecting portions between the sensor element and the output cable 507. The first resin member 509a is made of epoxy resin having a low thermal expansion coefficient.

A flange 512 is formed on an opening side of the case 508 for receiving the sensor element. The case 508 is inserted in a through hole of a bracket 511, and a ring 513 of rubber is engaged with an outer peripheral portion of the case 508 between the flange 512 and the bracket 511. This rubber ring 513 is held between the flange 512 and the bracket 511 under pressure. In this state, resin is injection-molded to cover any clearance between the opening side of the case 508 and the bracket 511, therby to form a second resin member 509b. The second resin member 509b is made of fiberglass reinforced nylon resin. An output cable protective member 510 is mounted around a covered portion of the output cable 507 close to an end thereof so that any clearance between the output cable 507 and the second resin member 509b is sealed through the output wire protective member 510. The output wire protective member 510 is made of urethane resin. The case 508 is made of stainless steel of the type SUS304, and the ring 513 is made of EP rubber.

According to this embodiment, the second resin member 509b is formed on the opening side of the case 508, whereby water infiltration into the case 508 is prevented even if a clearance should occur between the first resin member 509a and any such case 508 since the clearance is covered by the second resin member 509b. Thus, an improved water and air-tight seal is achieved.

Further, the ring 513 is held between the flange 512 and the bracket 511 under pressure, whereby the ring 513 is bonded to the flange 512 and the bracket 511 by its impact resilience. Therefore, even if a clearance should occur between the second resin member 509b and the bracket 511 or between the bracket 511 and the case 508 that would allow infiltration of water or the like, such infiltration is prevented since the rubber ring 513 adheres to the flange 512 and to the bracket 511, to ensure a water and air-tight seal of the case 508.

Figure 13:
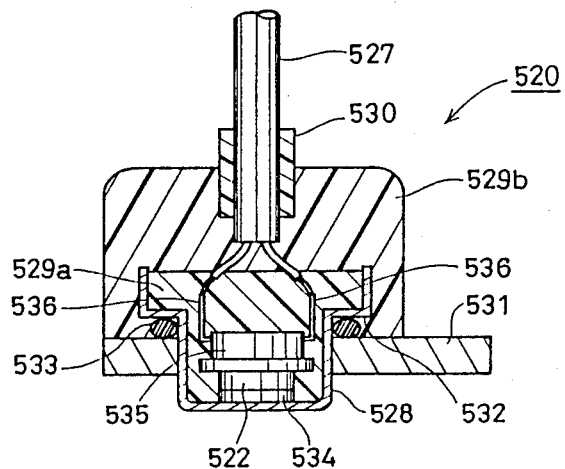
FIG. 13 is a sectional view showing a magnetic sensor according to a twelfth embodiment of the present invention.

FIG. 13 is a sectional view showing a magnetic sensor 520 according to a twelfth embodiment of the present invention. The magnetic sensor 520 shown in FIG. 13 comprises a magnet 522 in a case 528. A magnetic resistance element 534 is mounted on one side of the magnet 522. The magnetic resistance element 534 is in contact with the inner surface of the case 528. An electric circuit element 535 is provided on another side of the magnet 522 and terminals 536 are mounted on the electric circuit element 535, while forward end portions of output wires of a conductor cable 527 are connected to the terminals 536.

A sensor element formed by the magnet 522, the magnetic resistance element 534, the electric circuit element 535 and the terminals 536 thereof is contained in the case 528 and covered by a first resin member 529a. A flange 532 is formed on an opening side of the case 528. The case 528 is inserted in a through hole of a bracket 531, and a ring 533 of rubber is engaged with an outer peripheral portion of the case 528 between the flange 532 and the bracket 531. Rubber ring 533 is held between the flange 532 and the bracket 511 under pressure, any clearance between the opening side of the case 528 and the bracket 531 is covered by a resin in this state for forming a second resin part 529b. An output cable protective member 530 is mounted around an end portion as a covering for the output conductor cable 527.

In this embodiment, the opening portion of the case 528 is covered by the second resin member 529b, so that water or the like cannot infiltrates into the case 528 even if a clearance should occur between the case 528 and the first resin member 529a. Further, the rubber ring 533 is bonded to the flange 532 and to the bracket 531 by its impact resilience. Thus, even if a clearance should occur between the second resin member 529b and the bracket 511 or between the bracket 511 and the case 528, infiltration of water through the clearance is prevented by the rubber ring 533. The first resin member 529a, the second resin member 529b, the case 528 and the ring 533 are made of materials identical to those of the embodiment shown in FIG. 12.

Figure 14:
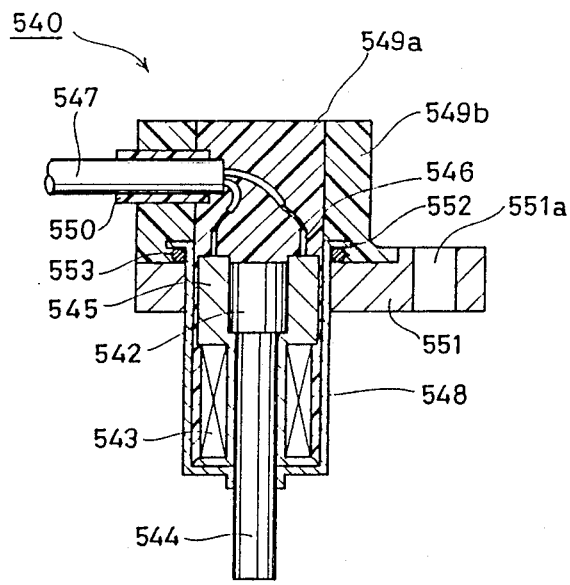
FIG. 14 is a sectional view showing a rotation sensor according to a thirteenth embodiment of the present invention.
Figure 15:
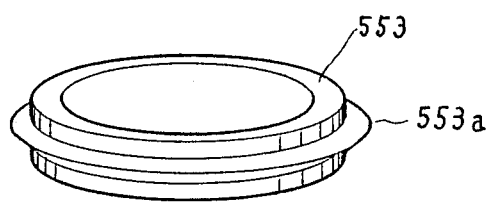
FIG. 15 is a perspective view showing a ring employed in the thirteenth embodiment as shown in FIG. 14.

FIG. 14 is a sectional view showing a rotation sensor 540 according to a thirteenth embodiment of the present invention. In the rotation sensor 540 as shown in FIG. 14, a sensor element formed by a magnet 542, a magnetic pole 544, a bobbin 545 and a coil 543 is contained in a case 548. A flange 552 is formed on an opening side of the case 548. The case 548 is inserted in a through hole of a bracket 551, and a ring 553 of resin is engaged between the flange 552 and the bracket 551. FIG. 15 is a perspective view showing the resin ring 553. As shown in FIG. 15, a raised portion 553a is formed along an outer peripheral surface of the resin ring 553. The bracket 551 has a through hole 551a for receiving a mounting bolt.

The ring 553 is held between the flange 552 and the bracket 551. In this state, a second resin member 549b is cylindrically formed between the flange 552 and the bracket 551. When the second resin member 549b is formed, an output conductor cable 547 is located in a position to be introduced from a side portion. The conductor cable is fixed in said position by the second resin member 549b through an output cable protective member 550.

Resin is filled into a cylindrical case formed by the second resin member 549b and the case 548, to form a first resin member 549a.

The second resin member 549b is made of nylon resin and the first resin member 549a is made of epoxy resin, while the resin ring 553 is made of urethane resin, respectively.

In this embodiment, the raised portion 553a of the resin ring 553 is melted to bond it to the second resin member 549b when the second resin member 549b is formed since the ring 553 is made or resin. Thus, the ring 553 is not only bonded to the flange 552 and to the bracket 551 by its impact resilience to define no clearance, but it is also bonded to the second resin member 549b to form a seal. Therefore, even if any clearance should occur between the second resin member 549b and the bracket 551 or between the bracket 551 and the case 548 and water or the like should try to infiltrate into the case through such a clearance, further infiltration thereof is prevented by the ring 553.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A sensor for detecting magnetic field variations, comprising: sensor means having a terminal for detecting magnetic field variations and for generating a respective signal; an output wire having an end connected to said terminal for outputting said signal from said sensor means; a case having an opening on a side close to said output wire, said case containing said sensor means; a first thermosetting resin filler in said case for convering said sensor means; and a second thermoplastic resin for hermetically sealing said opening in said case.

2. The sensor of claim 1, wherein said first thermosetting resin covers a connecting portion between said terminal and said output wire.

3. The sensor of claim 1, wherein said first thermosetting resin is epoxy resin and said second thermoplastic resin is polyamide resin.

4. The sensor of claim 1, wherein said second thermoplastic resin covers a connecting portion between said terminal and said output wire.

5. The sensor of claim 4, wherein said first thermosetting resin is epoxy resin and said second thermoplastic resin is polyamide resin.

6. The sensor of claim 1, wherein said case is made of metal, said sensor further including a junction thermoplastic resin between said metal case and said second thermoplastic resin.

7. The sensor of claim 6, wherein said junction thermoplastic resin is selected from urethane resin and polyamide resin.

8. The sensor of claim 6, wherein said second thermoplastic resin is polyamide resin.

9. The sensor of claim 1, further including a third thixotropic resin for covering a connecting portion between said output wire and said terminal after said first thermosetting resin has been filled into said case.

10. The sensor of claim 9, wherein said third thixotropic resin has a thermal expansion coefficient substantially identical to a thermal expansion coefficient of said first thermosetting resin.

11. The sensor of claim 1, further comprising a third thermosetting resin for covering a connecting portion between said output wire and said terminal after said first thermosetting resin has been filled into said case.

12. The sensor of claim 1, wherein said case has a flange on an opening side, said sensor further comprising a bracket mounted on an outer periphery of said case for mounting said sensor, and an elastic ring provided on an outer peripheral portion of said case between said bracket and said flange, said second thermoplastic resin being molded in a state holding said ring between said flange and said bracket under pressure, for covering a clearance between said flange and said bracket by said second thermoplastic resin.

13. The sensor of claim 12, wherein said ring is made of rubber.

14. The sensor of claim 12, wherein said ring is made of resin.

15. The sensor of claim 14, wherein said ring made of resin has been melted onto said second thermoplastic resin for adhering to said second thermoplastic resin.

* * * * *